Dec. 16, 1924.

H. CLARK

CONVEYING MECHANISM

Filed June 22, 1922

1,519,293

INVENTOR

HENRY CLARK

By his Attorneys

Patented Dec. 16, 1924.

1,519,293

UNITED STATES PATENT OFFICE.

HENRY CLARK, OF LONDON, ENGLAND, ASSIGNOR TO HEAD, WRIGHTSON AND COMPANY, LIMITED, OF THORNABY-ON-TEES, ENGLAND.

CONVEYING MECHANISM.

Application filed June 22, 1922. Serial No. 570,241.

*To all whom it may concern:*

Be it known that I, HENRY CLARK, a subject of the King of Great Britain, residing at 5 Victoria Street, London, S. W. 1, England, have invented new and useful Improvements in Conveying Mechanism, of which the following is a specification.

This invention relates to mechanism of the type in which a reciprocating movement is imparted to a conveyor or screen such as is now frequently used for conveying, screening or washing coal and other material, which is moved along the conveyor by causing the conveyor to move forward with a speed which slowly increases and quickly diminishes and then backward with a speed which quickly increases and slowly diminishes. Such motion is commonly known as the Marcus motion and is obtained by actuating the conveyor by a rod from a crank or eccentric on a countershaft, a crank on which is connected by a link to a crank on a driving shaft which is parallel to, but out of line with, the countershaft.

According to this invention I drive two parallel conveyors by means of two eccentrics set at 180° to one another and fixed on two countershafts placed one behind the other.

It is to be understood that hereinafter the word "eccentric" is intended to mean eccentric or crank.

By this arrangement the material in both conveyors is propelled in the same direction although the conveyors move simultaneously in opposite directions, and I am thus enabled to balance the shock and reduce the stresses on the supporting structure to a minimum.

Figure 1:
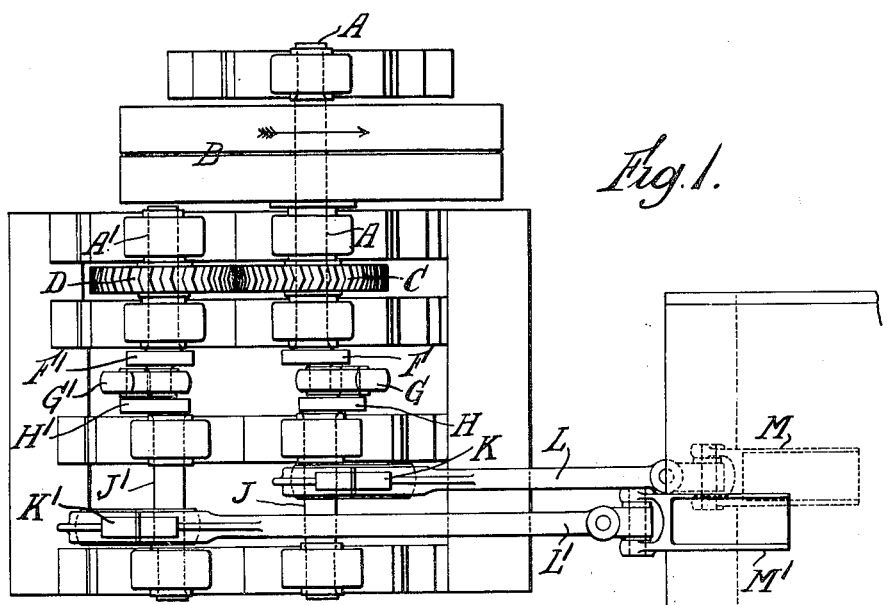
Figure 2:

The invention is illustrated by the accompanying drawing, of which Figure 1 is a plan view and Figure 2 is a diagrammatic view to a larger scale showing the positions of the shafts and the eccentrics.

A is the main shaft driven by a fly wheel belt pulley B; fast on this shaft A is gear wheel C meshing with a similar wheel D on a shaft A¹. On the two driving shafts A, A¹, are cranks F, F¹, connected by links G, G¹, plane containing the axes of the countershafts. On the countershafts are eccentrics K, K¹, set at 180° to one another when at the extreme limits of their strokes; the straps of these eccentrics are connected by rods L, L¹, to two conveyors M, M¹, which propel from left to right (as seen in Figure 1) material placed upon them.

It will be understood that as a result of this arrangement of the actuating mechanism, while one conveyor is moved outwards, the other is moved inwards, and thus the shock is balanced and the stresses on the supporting structure are reduced to a minimum.

What I claim is:—

1. In conveying mechanism, the combination of two driving shafts, means for rotating them in opposite directions, two countershafts, one behind the other, the axes of the driving shafts lying on opposite sides of a plane containing the axes of the countershafts, a crank on each driving shaft, a crank on each countershaft, a pair of links, one connecting the crank on one driving shaft to the crank on one countershaft, and the other connecting the crank on the other driving shaft to the crank on the other countershaft, an eccentric on each countershaft, the two eccentrics being set at 180° to one another, and two conveyors connected to the two eccentrics.

2. In conveying mechanism, the combination of two driving shafts, means for rotating them in opposite directions, two countershafts, one behind the other, a crank on each driving shaft, a crank on each countershaft, a pair of links, one connecting the crank on one driving shaft to the crank on one countershaft, and the other connecting the crank on the other driving shaft to the crank on the other countershaft, the front countershaft being in front of and above its driving shaft and the back countershaft being in front of and below its driving shaft, an eccentric on each countershaft, the two eccentrics being set at 180° to one another, and two conveyors connected to the two eccentrics.

shafts lying on opposite sides of a plane containing the axes of the countershafts, a crank on each driving shaft, a crank on each countershaft, a pair of links, one connecting the crank on one driving shaft to the crank on one countershaft, and the other connecting the crank on the other driving shaft to the crank on the other countershaft, an eccentric on each countershaft, the two eccentrics being set at 180° to one another, and two conveyors connected to the two eccentrics.

In testimony that I claim the foregoing as my invention I have signed my name this 31st day of May, 1922.

HENRY CLARK.